(12) United States Patent
Pei

(10) Patent No.: US 9,122,008 B2
(45) Date of Patent: Sep. 1, 2015

(54) OPTICAL ELEMENT WITH INFRARED ABSORBING LAYER AND LENS MODULE INCLUDING SAME

(75) Inventor: Shao-Kai Pei, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 516 days.

(21) Appl. No.: 13/534,285

(22) Filed: Jun. 27, 2012

(65) Prior Publication Data

US 2013/0258455 A1  Oct. 3, 2013

(30) Foreign Application Priority Data

Mar. 29, 2012  (TW) .............................. 101110961 A

(51) Int. Cl.
G02B 5/20 (2006.01)
G02B 5/22 (2006.01)
G02B 5/28 (2006.01)
G02B 13/00 (2006.01)

(52) U.S. Cl.
CPC ................ *G02B 5/223* (2013.01); *G02B 5/208* (2013.01); *G02B 5/282* (2013.01); *G02B 13/003* (2013.01)

(58) Field of Classification Search
None
See application file for complete search history.

(56) References Cited

U.S. PATENT DOCUMENTS

RE33,729 E  *  10/1991  Perilloux ........................ 359/359
5,568,316 A  *  10/1996  Schrenk et al. ................ 359/584

* cited by examiner

*Primary Examiner* — Derek S Chapel
(74) *Attorney, Agent, or Firm* — Novak Druce Connolly Bove + Quigg LLP

(57) ABSTRACT

An optical element includes a transparent substrate and an infrared absorbing layer on an object-side surface of the transparent substrate. The infrared absorbing layer is a thermo sensitive ink printed or deposited on the transparent substrate. The thermo sensitive ink is cured to blue color.

6 Claims, 4 Drawing Sheets

OPTICAL ELEMENT WITH INFRARED ABSORBING LAYER AND LENS MODULE INCLUDING SAME

BACKGROUND

1. Technical Field

The present disclosure relates to optical elements and, particularly, to an optical element for absorbing infrared light and a lens module including the optical element.

2. Description of Related Art

Lens modules may include at least one lens and a filter positioned at an image side of the lens. The filter may include a transparent substrate and an infrared filtering film coated on an object side of the transparent substrate. The filter is for reflecting infrared light rays while allowing the passage of visible light rays. However, about 5% or more of visible light rays are also reflected by the infrared filtering film. The reflected visible light rays form a glare in the image after multiple reflections in the lens module.

Therefore, it is desirable to provide a lens module, which can overcome the limitations described.

DETAILED DESCRIPTION

Embodiments of the disclosure will be described with reference to the drawings.

Figure 1:
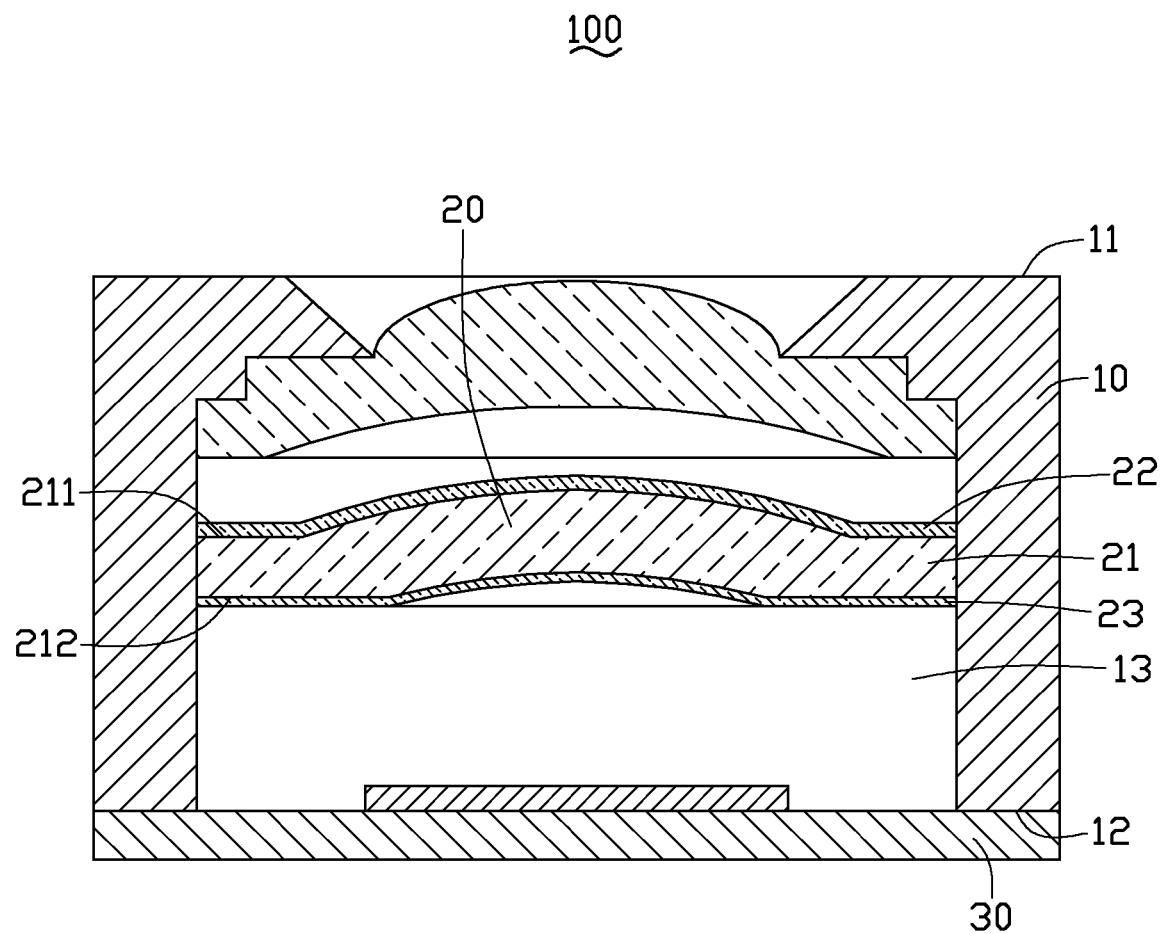
FIG. 1 is a cross-sectional schematic view of a lens module in accordance with a first exemplary embodiment, the lens module including an optical element.

Referring to FIG. 1, a lens module 100, according to a first exemplary embodiment, includes a lens barrel 10, an optical element 20, and an image sensor 30. Light coming into the lens barrel 10 passes through the optical element 20 and forms images on the image sensor 30.

The lens barrel 10 is tubular and includes an object-side end 11 and an image-side end 12 opposite to the object-side end 11. The lens barrel 10 defines a substantially tubular receiving room 13 extending through the object-side end 11 and the image-side end 12. In the embodiment, the lens barrel 10 is made of light-shielding/opaque/black material(s).

The optical element 20 is received in the receiving room 13 and includes a transparent substrate 21, an infrared absorbing layer 22, and an infrared reflecting film 23. The transparent substrate 21 includes an object-side surface 211 and an image-side surface 212 opposite to the object-side surface 211. In this embodiment, the transparent substrate 21 is a lens made of glass, and each of the object-side surface 211 and the image-side surface 212 is spherical or aspheric surfaces.

The infrared absorbing layer 22 is formed on the transparent substrate 21. In this embodiment, the infrared absorbing layer 22 is formed on the object-side surface 211. The infrared absorbing layer 22 is a thermo-sensitive ink evenly printed or deposited on the transparent substrate 21. The thermo-sensitive ink is a thermosetting resin and is cured at a temperature of about 60° C.-100° C. The thermo-sensitive ink is cured to blue color on the transparent substrate 21, and the color is irreversible. This infrared absorbing layer 22 absorbs infrared light rays while passing visible light rays. In this embodiment, the main composition of the thermo-sensitive ink is benzenediol, mequinol, p-benzoquinone, and 2, 6-ditertbutyl methylphenol.

The infrared reflecting film 23 is coated on the opposite surface of the transparent substrate 21 facing away from the infrared absorbing layer 22. In this embodiment, the infrared reflecting film 23 is formed on the image-side surface 212. The infrared reflecting film 23 includes fifty-four layers stacked in an order facing away from the image-side surface 212. The odd numbered layers of the infrared reflecting film 23 are made from titanium dioxide ($TiO_2$) and the even numbered layers of the infrared reflecting film 23 are made from silicon dioxide ($SiO_2$).

The infrared reflecting film 23 is configured for reflecting any infrared lights passing the infrared absorbing layer 22. The infrared reflecting film 23 is designed according to the absorbing effect of the infrared absorbing layer 22. The infrared reflecting film 23 can have any number of layers with other materials for reflecting infrared light.

The image sensor 30 is positioned at the image-side end 12 and covers the receiving room 13. The light passing the lens 20 will be directly projected on an imaging surface of the image sensor 30 which converts the light to electrical signals.

Figure 2:
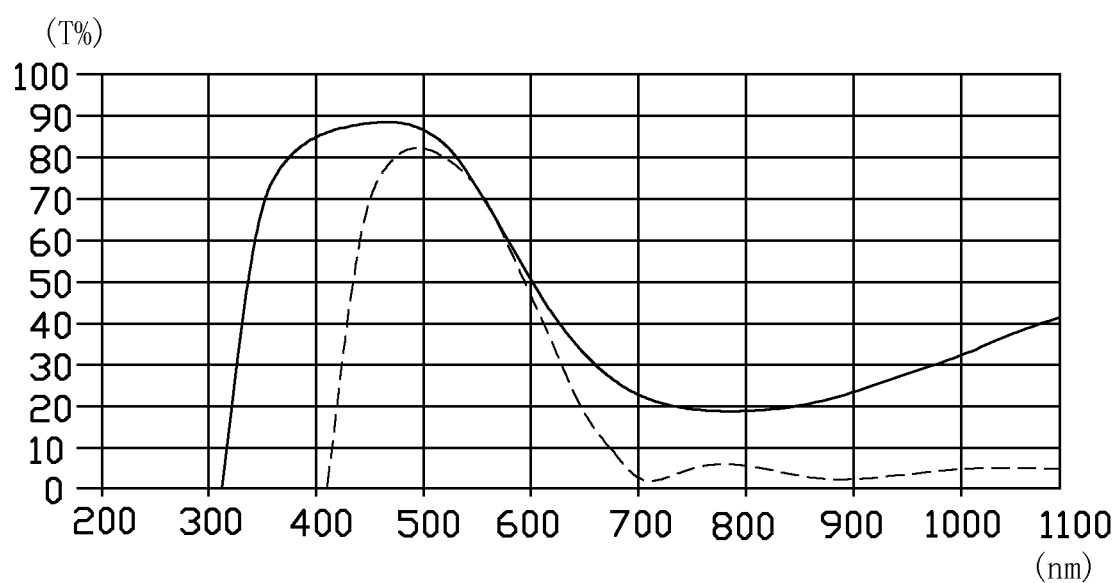
FIG. 2 is a spectrum chart of the optical element of the lens module of FIG. 1.

Further referring to FIG. 2, light entering into the lens module 100 from the object-side end 11 of the lens barrel 10 strikes the optical element 20. The light rays penetrate the infrared absorbing layer 22, and then the transparent substrate 21, and then the infrared reflecting film 23. The infrared lights of the light rays are firstly absorbed by the infrared absorbing layer 22, and are secondly reflected by the infrared reflecting film 23.

The dashed line in FIG. 2 represents a spectrum chart of an optical element 20 without the infrared reflecting film 23, the solid line represents a spectrum chart of an optical element 20 where the infrared reflecting film 23 is present. Both of the two optical elements 20 can filter out infrared light and allow passage of visual light rays, but the effectiveness of the optical element 20 with the infrared reflecting film 23 is greater than that of the optical element 20 without the infrared reflecting film 23.

Figure 3:
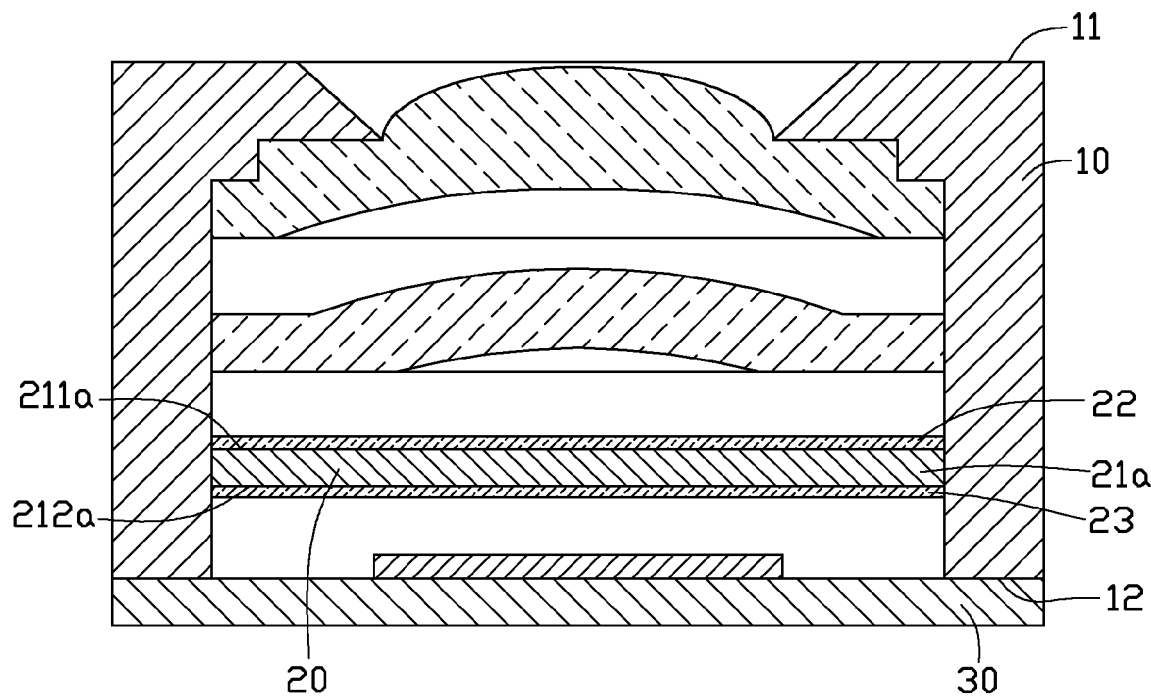
FIG. 3 is a cross-sectional schematic view of a lens module in accordance with a second exemplary embodiment, the lens module including an optical element.

Referring to FIG. 3, a lens module 100a, according to a second exemplary embodiment, is shown. The difference between the lens module 100a of the second exemplary embodiment and the lens module 100 of the first exemplary embodiment is that the transparent substrate 21a is a flat disc. The transparent substrate 21a includes an object-side surface 211a and an image-side surface 212a opposite to the object-side surface 211a. There is no curvature of the image-side surface 212a and the object-side surface 211a. The infrared absorbing layer 22 is formed on the object-side surface 211a, and the infrared reflecting film 23 is coated on the image-side surface 212a.

Figure 4:
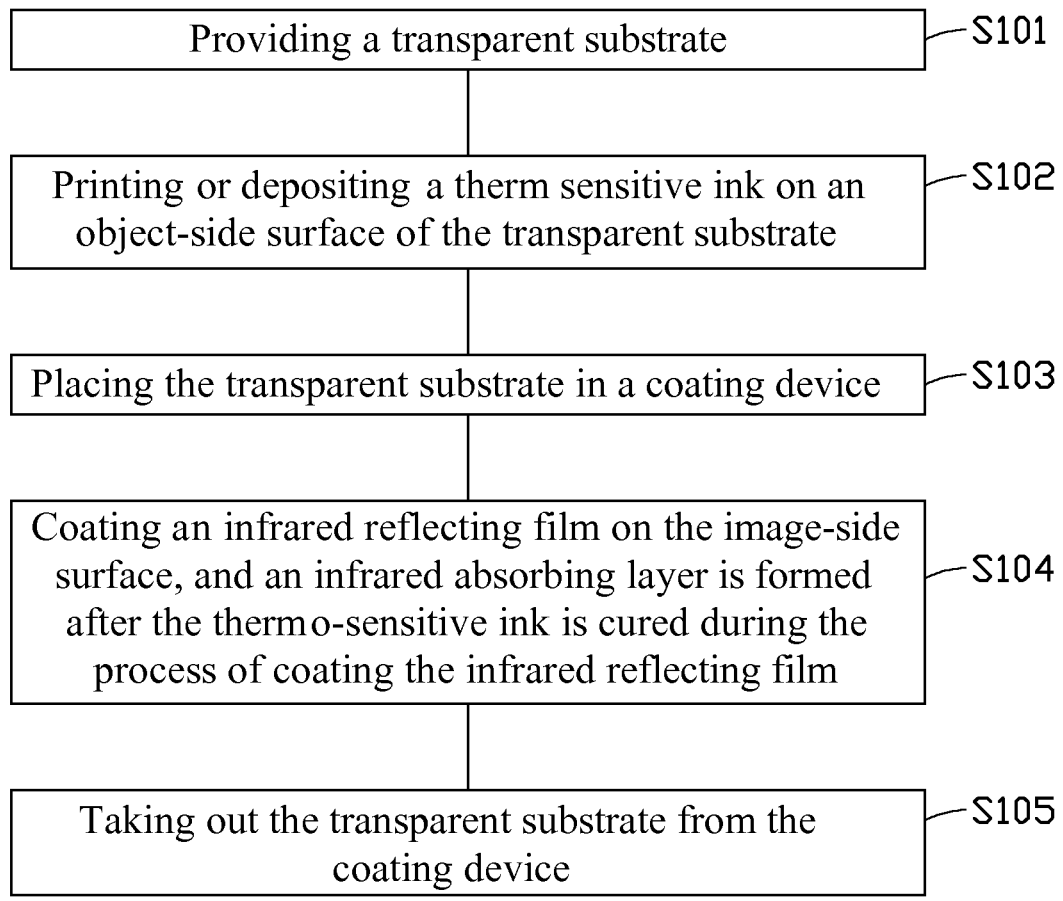
FIG. 4 is a flowchart of a method of manufacturing the optical element of FIG. 1 or FIG. 3.

Referring to FIG. 4, a method of manufacturing the optical element 20 includes steps S101-S105.

S101: providing a transparent substrate 21; the transparent substrate 21 can be a lens, a flat disc of glass or any other optical element, received in a lens barrel 10;

S102: printing or depositing a thermo-sensitive ink on an object-side surface of the transparent substrate 21;

S103: placing the transparent substrate 21 in a coating device (not shown), the coating device includes a target source (not shown), and an image-side surface of the transparent substrate 21 faces the target source;

S104: coating an infrared reflecting film 23 on the image-side surface, and an infrared absorbing layer is formed after the thermo-sensitive ink is cured during the process of coating the infrared reflecting film 23; the thermo-sensitive ink is cured to blue color and forms an infrared absorbing layer 22;

S105: taking out the transparent substrate 21 from the coating device.

Particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. An optical element, comprising:
   a transparent substrate comprising an object-side surface and an image-side surface opposite to the object-side surface;
   an infrared absorbing layer positioned on the object-side surface of the transparent substrate; wherein the infrared absorbing layer is a thermo-sensitive ink, the thermo-sensitive ink is cured to be in blue color; and
   an infrared reflecting film coating on the image-side surface of the transparent substrate, wherein the infrared reflecting film comprises fifty-four layers stacked in an order facing away from the image-side surface; the odd numbered layers of the infrared reflecting film are made from titanium dioxide; the even numbered layers of the infrared reflecting film are made from silicon dioxide.

2. The optical element of claim 1, wherein the transparent substrate is a lens, and each of the object-side surface and the image-side surface is a spherical or aspheric surface.

3. The optical element of claim 1, wherein the transparent substrate is a flat disc.

4. A lens module, comprising:
   a lens barrel; and
   an optical element received in the lens barrel, comprising:
      a transparent substrate comprising an object-side surface and an image-side surface opposite to the object-side surface;
      an infrared absorbing layer positioned on the object-side surface of the transparent substrate; wherein the infrared absorbing layer is a thermo-sensitive ink, the thermo-sensitive ink is cured to be in blue color; and
      an infrared reflecting film coating on the image-side surface of the transparent substrate, wherein the infrared reflecting film comprises fifty-four layers stacked in an order facing away from the image-side surface; the odd numbered layers of the infrared reflecting film are made from titanium dioxide; the even numbered layers of the infrared reflecting film are made from silicon dioxide.

5. The lens module of claim 4, wherein the transparent substrate is a lens, and each of the object-side surface and the image-side surface is a spherical or aspheric surface.

6. The lens module of claim 4, wherein the transparent substrate is a flat disc.

* * * * *